No. 607,545. Patented July 19, 1898.
L. L. MARTIN.
BICYCLE HOLDER.
(Application filed Apr. 5, 1897.)
(No Model.)
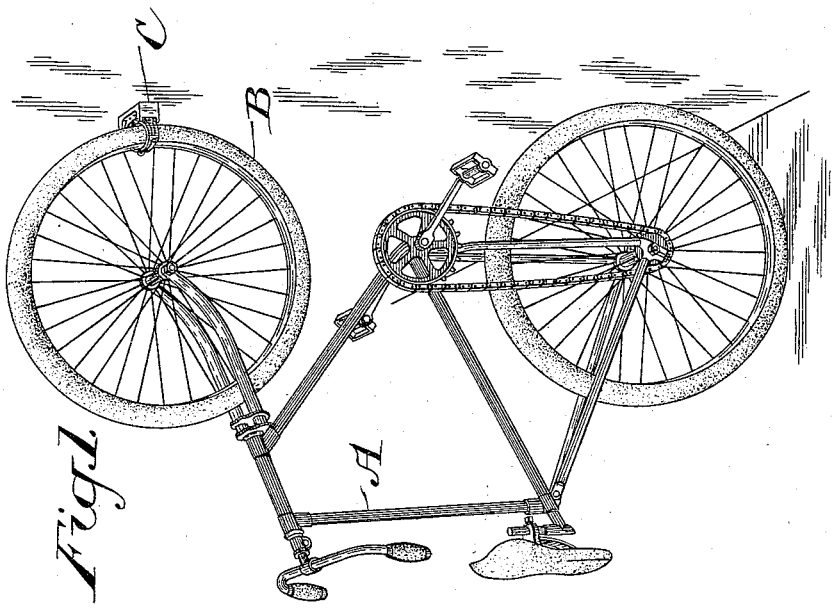
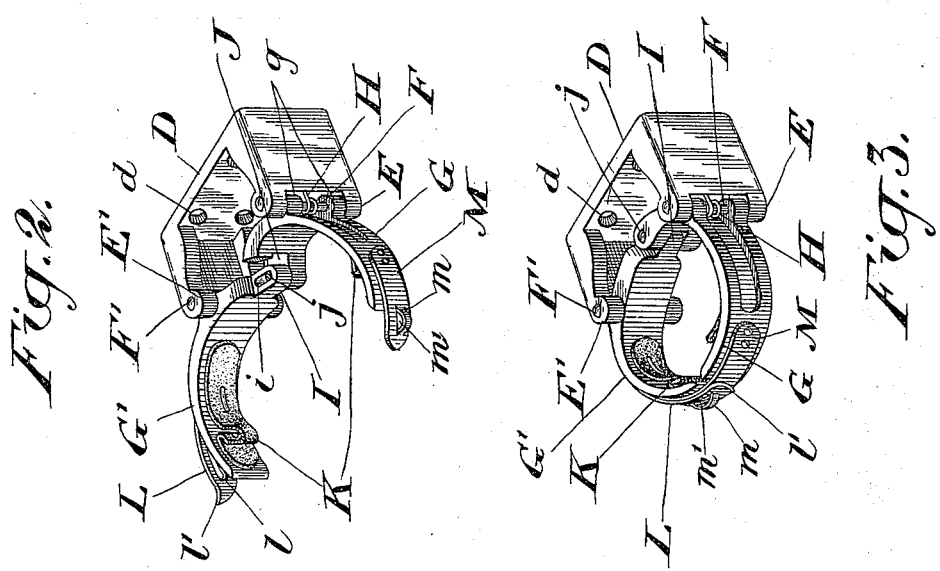
Witnesses  Inventor

UNITED STATES PATENT OFFICE.

LOUIS L. MARTIN, OF TORONTO, CANADA.

BICYCLE-HOLDER.

SPECIFICATION forming part of Letters Patent No. 607,545, dated July 19, 1898.

Application filed April 5, 1897. Serial No. 630,841. (No model.)

*To all whom it may concern:*

Be it known that I, LOUIS LINNEAUS MARTIN, electrician, of the city of Toronto, in the county of York and Province of Ontario, Canada, have invented a certain new and Improved Bicycle-Holder, of which the following is a specification.

The object of the invention is to provide a cycle-holder which is simple and compact in form and convenient to manipulate and which stands normally open to receive the wheel and automatically closes and locks around the tire as it is pressed into place against the inner hinged portion of my device; and it consists, essentially, of jaws hinged together at their rear ends and pivotally connected to a bracket and held normally open to receive the tire by means of springs and means for automatically locking the jaws together when caused to close on each other against the spring-pressure, as hereinafter specifically described, and then definitely claimed.

Figure 1 is a perspective view of a bicycle standing on end against a wall, the fore wheel being held in place by means of my holder. Fig. 2 is a perspective detail of my holder, on a larger scale, showing it with the jaws spread and in its normal position to receive the wheel of a bicycle, the inner end of one of the jaws being broken away, so as to expose the slotted portion of the hinge for the jaws. Fig. 3 is a similar enlarged detail showing the jaws closed and engaging with each other, as when holding the bicycle in place.

In the drawings like letters of reference indicate corresponding parts in the different figures.

In Fig. 1, in which a bicycle is shown in perspective standing on end and held in place against a wall, A is the bicycle, and B the front wheel thereof.

C is the holder, embracing the tire and rim and holding the bicycle in position against the wall. This holder C should be fixed to the wall at a suitable height to hold a bicycle standing on end, as indicated. The parts of this holder C are shown in the enlarged details, Figs. 2 and 3, in which D is a suitably-shaped bracket provided with holes $d$, through which bolts or screws may pass to secure it to the wall.

E E' are bosses formed on the ends of the bracket, through which pass the pivots F F', which are thus securely held in place.

G G' are jaws which are circular in shape. These jaws are journaled on the pivots F F' by means of the perforated lugs $g$, formed on the outer faces thereof, the pivots passing through the lugs.

H is a spring which bears against the end of the bracket, the jaw G, and the pivot F. A similar spring (not shown in the drawings) is also applied to the other jaw G' for the purpose of holding the jaws G G' in a normally open position, as indicated in Fig. 2, so as to be ready to receive the wheel of the bicycle when it is placed therein. Any other form of spring which would hold the jaws normally open, as indicated, would of course be equivalent.

The inner ends of the circular jaws are preferably hinged adjustably together at their inner ends by forming a projection I on the end of one of the jaws. In this instance it is shown on the end of the jaw G'. This projection is slotted at $i$ and is rounded at the end, so as to fit and move within the recess J, formed in this instance in the end of the jaw G. The upper wall of this recess J is shown broken away in Fig. 2, as well as the hinged pin $j$, so as to exhibit this hinged pin $j$ in operative position within the slot $i$, formed in the projection I. In Fig. 3 this hinged joint is shown complete, with the hinge-pin $j$ passing through the walls of the recess and through the slotted hole $i$, formed in the projection I. The hinged pin $j$, having thus freedom of action in the slot $i$, admits of the circular jaw moving either into its open or closed position, as shown in Figs. 2 and 3, without in any wise checking such movements. In these detail figures are shown rubber pads K, which are attached on the inner face of the jaws by being folded back upon themselves, as indicated, and riveted through the fold. The pad is then drawn backward over the head of the rivet and attached to the jaw nearer its hinge. The projection formed in this manner fits within the groove between the tire and the rim and effectually holds the rim from wabbling.

L is a spring-holder provided with slot $l$ and preferably turned outwardly at the end at $l'$ to facilitate the entrance of the spring-tongue M when the jaws come together. This spring-tongue M is riveted or attached to the jaw G in such a manner that the end of it may preferably project beyond the end of this jaw G, and it is slightly curved, as indicated, forming, as it were, a part of a larger circle than the circle indicated by the jaws G G'. This spring-tongue M has formed in the free end thereof, as indicated in Fig. 2, a catch m, which is designed to enter and engage within the slot l, formed in the spring-holder L, which is also riveted or attached to the outer face of the jaw G'. This spring-holder L preferably does not project beyond the end of this jaw G' in the manner indicated for the spring-tongue M.

It will be seen from the foregoing description that as the bicycle-wheel is being pushed into place against the wall it bears against the adjustable hinge connection at the inner ends of the jaws G G', causing the jaws to rotate on the pivots F F' against the action of the springs H H, the tendency of these springs being of course to keep the device normally open, as indicated in Fig. 2. As the wheel-tire presses against this hinged connection the circular jaws close around the rim and tire and automatically lock in the position indicated in Fig. 3, the spring-tongue M passing the under face of the spring-holder L, so that the catch m will spring into position and engage with the slot l in the spring-holder L, and thus automatically lock the jaws together. For further security a small padlock may be inserted through the hole m', formed by the catch when it has passed above the outer face of the spring-holder L.

I am aware of German Patent No. 88,261 and the United States Patent No. 572,770, and do not attempt to claim anything shown therein, as I regard my invention as materially and essentially different therefrom.

What I claim as my invention is—

1. A cycle-holder, comprising a bracket provided with means by which it may be rigidly secured to a wall or other support, two jaws pivoted to said bracket and having their rear ends hinged together intermediate of the points where they are pivoted, one of said jaws having a slot in which the pintle of the hinge works, and means for normally holding said jaws open to receive the tire, whereby the hinged ends of said jaws are normally held forward of their pivot-points ready for a wheel-tire to push them back and thereby cause the front ends of said jaws to come together, and means for automatically locking said jaws together when they close, substantially as described.

2. In a cycle-holder, the combination of bracket D; the pivots F, F'; the jaws G, G', suitably pivoted on the pivots F, F', and adjustably hinged together at their inner ends one of said jaws having a slot in which the pintle of the hinge works; the springs H; the slotted spring-holder L, and spring-tongue M, provided with catch m, adapted to engage the slot l, substantially as specified.

3. In a cycle-holder, the combination of bracket D, provided with bosses E, E'; the pivots F, F'; the jaws G, G', with perforated lugs g, formed thereon to receive the pivots; the projection I, slotted at i, and formed on the end of one jaw, and the recess J, in the end of the other jaw; and hinge-pin j, for holding the ends adjustably together; the rubber pads K, connected as shown; the springs H; the spring-holder L, with slot l, and upwardly-turned end l'; the spring-tongue M, provided with catch m, adapted to engage in the slot l, substantially as specified.

Toronto, March 31, 1897.

LOUIS L. MARTIN.

In presence of—
A. M. NEFF,
FREDK. CLARKE.